United States Patent [19]

Kuroiwa

[11] Patent Number: 5,377,135
[45] Date of Patent: Dec. 27, 1994

[54] HIGH CARDINAL NUMBER TYPE NON-RESTORING DIVIDER REDUCING DELAY TIME FOR ADDING TWO NUMBERS

[75] Inventor: Koichi Kuroiwa, Kawasaki, Japan
[73] Assignee: Fujitsu Limited, Kawasaki, Japan
[21] Appl. No.: 983,597
[22] PCT Filed: Jun. 5, 1992
[86] PCT No.: PCT/JP92/00725
§ 371 Date: Feb. 5, 1993
§ 102(e) Date: Feb. 5, 1993
[87] PCT Pub. No.: WO92/22027
PCT Pub. Date: Dec. 10, 1992

[30] Foreign Application Priority Data

Jun. 7, 1991 [JP] Japan .................. 3-136639

[51] Int. Cl.$^5$ ................................ G06F 7/52
[52] U.S. Cl. .................................. 364/767
[58] Field of Search ............ 364/767, 764, 761, 736, 364/748

[56] References Cited

U.S. PATENT DOCUMENTS

4,722,069 1/1988 Ikeda .................... 364/767
5,031,138 7/1991 Maass et al. .......... 364/767

FOREIGN PATENT DOCUMENTS

60-54045 3/1985 Japan.
61-7939 1/1986 Japan.

OTHER PUBLICATIONS

*IBM Technical Disclosure Bulletin,* vol. 30, No. 6, Nov. 1987, Armonk, NY, "Radix 16 Divider," pp. 415–419.

Primary Examiner—David H. Malzahn
Attorney, Agent, or Firm—Staas & Halsey

[57] ABSTRACT

A high cardinal number non-restoring type divider by itself or a floating point coprocessor or vector processor using such a divider is made up by a multiple generating unit for obtaining multiples of a divisor from information based on the predicted quotient value, an arithmetic processing unit for outputting an arithmetic result of multiples of the divisor and a dividend and a sign bit expressing the polarity of the arithmetic result, a decode processing unit for starting the decode processing during generation of the sign bit and outputting any one of the decoding signal of the arithmetic result and the decoding signal of the complement of the arithmetic result depending on the sign bit and a predicted quotient generating unit for generating a predicted quotient depending on an output of the decode processing unit. Since the decode processing is started without waiting for a decision of the most significant bit (sign bit) of the arithmetic result and thereafter the decoding result is selected depending on the most significant bit (sign bit) when the most significant bit is decided, useless delay time (tα) generated with a carry propagation can be absorbed by the decode processing time (tβ) and the arithmetic processing time can be curtailed.

6 Claims, 14 Drawing Sheets

$C_0 \sim C_2$ : Carry

Fig. 12

An example where the predicted quotient of 4 bits is outputted from the significant 9 bits of divisor and Significant 5 bits of partial remainder mi : Predicted quotient
Pi : Significant 5 bits of partial remainder
Di : Significant 9 bits of divisor

Fig. 13

| mi' | | Multiple selecting signal | | | | | |
|---|---|---|---|---|---|---|---|
| | | When the preceding partial remainder is positive | | | When the preceding partial remainder is negative | | |
| (Decimal) | (Binary) | SELa | SELb | SELc | SELa | SELb | SELc |
| 0 | 0000 | 0 | 0 | 0 | 0 | 0 | 0 |
| 1 | 0001 | 0 | 0 | −1 | 0 | 0 | +1 |
| 2 | 0010 | 0 | −2 | 0 | 0 | +2 | 0 |
| 3 | 0011 | 0 | −2 | −1 | 0 | +2 | +1 |
| 4 | 0100 | 0 | −4 | 0 | 0 | +4 | 0 |
| 5 | 0101 | 0 | −4 | −1 | 0 | +4 | +1 |
| 6 | 0110 | −8 | +2 | 0 | +8 | −2 | 0 |
| 7 | 0111 | −8 | 0 | +1 | +8 | 0 | −1 |
| 8 | 1000 | −8 | 0 | 0 | +8 | 0 | 0 |
| 9 | 1001 | −8 | 0 | −1 | +8 | 0 | +1 |
| 10 | 1010 | −8 | −2 | 0 | +8 | +2 | 0 |
| 11 | 1011 | −8 | −2 | −1 | +8 | +2 | +1 |
| 12 | 1100 | −16 | +4 | 0 | +16 | −4 | 0 |
| 13 | 1101 | −16 | +4 | −1 | +16 | −4 | +1 |
| 14 | 1110 | −16 | +2 | 0 | +16 | −2 | 0 |
| 15 | 1111 | −16 | 0 | +1 | +16 | 0 | −1 | mi → 5

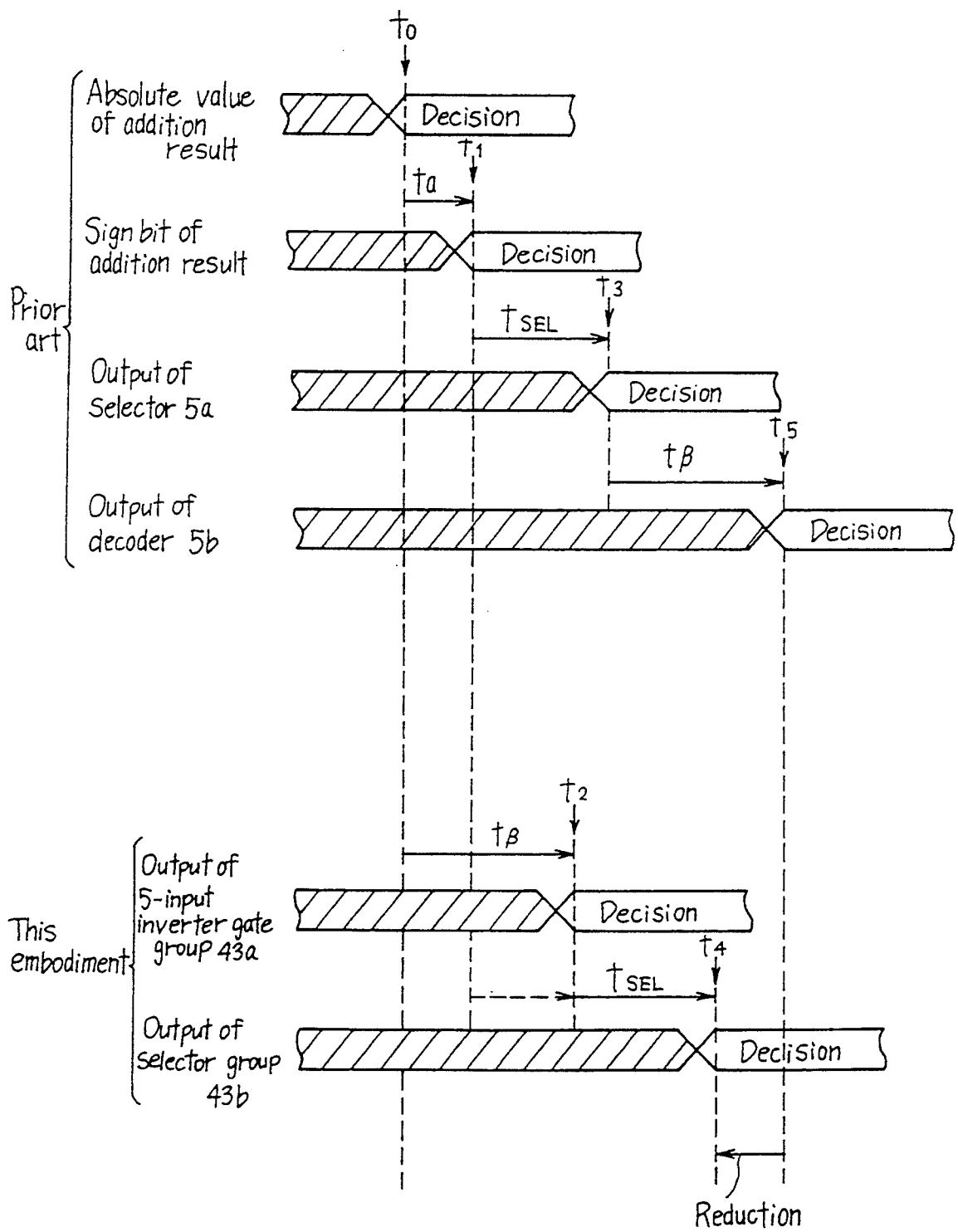

HIGH CARDINAL NUMBER TYPE NON-RESTORING DIVIDER REDUCING DELAY TIME FOR ADDING TWO NUMBERS

FIELD OF THE INVENTION

The present invention relates to a high cardinal number type non-restoring divider and more specifically to a divider or a floating point type coprocessor or vector processor including a divider.

FIELD OF THE INVENTION

Division is generally considered, in conceptually, as an inverse processing of multiplication, but different, in many respects, from multiplication. First, prior- and post-processing are not independent, and are conducted sequentially. With division, since all partial products can be obtained simultaneously, processing is not conducted sequentially and, therefore, extra arithmetic cycles are required for divisions, in comparison with multiplication. Second, division is not deterministic processing but is trial-and-error processing. That is, a predicted processing of a partial quotient is required in the process of repetitive arithmetic operations. For example, a digit selection rule for selecting each digit of a series of quotients from an aggregation of digits is used.

FIG. 1 is an block diagram of a conventional divider, showing an example of a high cardinal number non-restoring divider. Here, the system of division can be classified into restoring division and non-restoring division from the difference of digit aggregation. Restoring division is essentially the same as division by a manual arithmetic operation and can easily be realized, but sometimes requires a longer execution time if a large number of zeroes exists within the digits of the quotient. It is because processing, including addition, for restoring a partial remainder is also required if a negative partial remainder exits. Meanwhile, non- restoring division is not required to restore a negative remainder to a positive remainder, so long as an absolute value of the remainder is smaller than the divisor and is superior to the point that such extra addition is not required. Such a division method is explained, for example, in the "Computer Arithmetic PRINCIPLES, ARCHITECTURE, AND DESIGN" Kai Hwang, issued by John Wiley & Sons, Inc., Chapter 7 or in the Japanese Patent Laid-Open No. 61-7939 (Laid-Open Date: Jan. 14, 1986, "HIGH CARDINAL NUMBER TYPE NON-RESTORING DIVIDER").

A high cardinal number type non-restoring divider uses a cardinal number which is larger than 2 (high cardinal number) and can quickly reduce the number of repetitive processings which are required for execution of the division instruction, with an increase of the cardinal number. Thereby, the execution time is reduced.

In FIG. 1, the reference numeral 1 denotes a divisor register; 2, a dividend register; 3, a multiple generator; 2, an adder/subtractor; 5, a complement generator; 6, a quotient predicting unit; 7, a quotient compensating unit; 8, a quotient register. Only one quotient predicting unit 6, corresponding to a positive or negative partial remainder, is shown to reduce the circuit scale shown in FIG. 1.

A general flow of arithmetic processing is as follow: ① content of the divisor register 1 (DSR) is multiplied by m (m is a multiple generated in the multiple generator 3), ② m×DSR and content (PR) of the dividend register 2 are added, ③ either the significant n-bits (hereinafter, preferentially n=5) of the addition result, excluding the sign bit, or an output of the complement converting circuit 5b (obtained by complement conversion of the significant 5 bits, excluding the sign bit of the addition result) is given to a decoder 5c (the detail of the structure will be explained in the "DESCRIPTION OF THE PREFERRED EMBODIMENTS" Section. For example, when the sign bit is 0, meaning that the sign is positive, the 5 bits of the addition result are provided directly to the decoder 5c, and when the sign bit is 1, meaning that the sign is negative, the complement of the 5 bits of the addition result are provided to the decoder 5c. A series of operations for generating a quotient predicting signal, based on the an output of the decoder 5c and contents of dividend register 1, are repeated for each digit to determine a partial quotient.

However, such a conventional divider employs a structure for uniquely selecting an addition result, which is the significant 5 bits, excluding the sign bit, or the same addition result after complement conversion, depending on the sign bit of the same addition result. Therefore, since the decoding process cannot be started until the sign bit is determined, a problem arises in that a delay time, $t\alpha$, which is temporarily defined for the convenience of explanation as the time between the determination of the addition result of the 5 significant bits, excluding the sign bit, and the determination of the sign bit of the addition result is added to the processing time ($t\beta$, which is temporarily defined for the convenience of explanation, of the decoder 5c. Particularly, such a delay time becomes very large in a vector processor which repeats division many times.

FIG. 2 shows a practical circuit diagram of the complement generator 5. The addition result of 5 bits excluding the sign bit, is given to an input A of a selector 5a in direct logic, and is also applied to the input B by an inverter (complement converting circuit 5b) through logical inversion (namely, complement conversion). Selection of inputs A and B depends on the most significant bit (sign bit) of the addition result. Therefore, when the sign bit is 0, input A is selected, and when the sign bit is 1, input B is selected.

Here, all bits of the addition result are determined after transfer of the carry to the most significant bit (generally, the sign bit) and an output of the selector 5a. That is, an input to the decoder 5c is determined at least after the time corresponding to the maximum value of the carry transfer in the adder/subtractor 2. However, since data is given to inputs A and B of the selector 5a before the time corresponding to the maximum value of the carry transfer, if a delay by the wiring or a delay by inverter 5b is neglected, a useless delay time ($t\alpha$), corresponding to the period until the sign bit of the addition result is determined from the time when the 5 bits of the addition result, excluding the sign bit, are determined, is generated.

The present invention has been proposed considering such a technical problem. It is therefore, an object of the present invention to further reduce the time required to execute the arithmetic operation time by absorbing the useless delay time ($t\alpha$) generated in the carry transfer with a decoding time ($t\beta$).

SUMMARY OF THE INVENTION

To attain the object explained above, a divider of the present invention, the principle diagram of which is shown in FIG. 3, comprises a multiple generating means (10) for obtaining a multiple value of a divisor, from the information based on a quotient predicting value; an arithmetic unit (11) for outputting an arithmetic result of a multiple of the divisor and a dividend and a sign bit which indicates polarity of the result of such arithmetic operation; a decode processing unit (12) for starting the decoding process during generation of the sign bit and outputting either the decoding signal of the arithmetic result or the decoding signal of the complement of the arithmetic result, depending on the sign bit; and a predicted quotient value generating unit (14) for generating a predicted quotient value depending on an output of the decode processing unit . More preferentially, the decode processing unit comprises a plurality of output terminals, a decoder for decoding the arithmetic result to provide a plurality of outputs, and a selecting unit (13), which is connected between a plurality of output terminals and the decoder, and is responsive to the sign bit. The selecting unit switches the connection between a plurality of outputs of the decoder and a plurality of output terminals so that either the decoding signal of the arithmetic result or a decoding signal of the complement of the arithmetic result may be outputted, depending on the sign bit. In the case of the present invention, the decoding process can be started without waiting for a determination of the most significant bit (sign bit) of the arithmetic result and, thereafter, the decoding result is selected by the most significant bit (sign bit) upon determination thereof. Therefore, the useless delay time ($t\alpha$) generated by a carry transfer can be absorbed by the decoding time ($t\beta$). Thereby, further curtailment of the arithmetic processing time can be realized.

BRIEF DESCRIPTION OF THE DRAWINGS

FIG. 12 is a predicting table diagram of a quotient forecasting means (QP) of FIG. 6;

FIG. 13 is a signal generating table diagram of a quotient predicting means (QP) of FIG. 6;

FIG. 15 is a timing chart for a comparison of delay times between the prior art and the present invention.

DESCRIPTION OF THE PREFERRED EMBODIMENT

Figure 1:
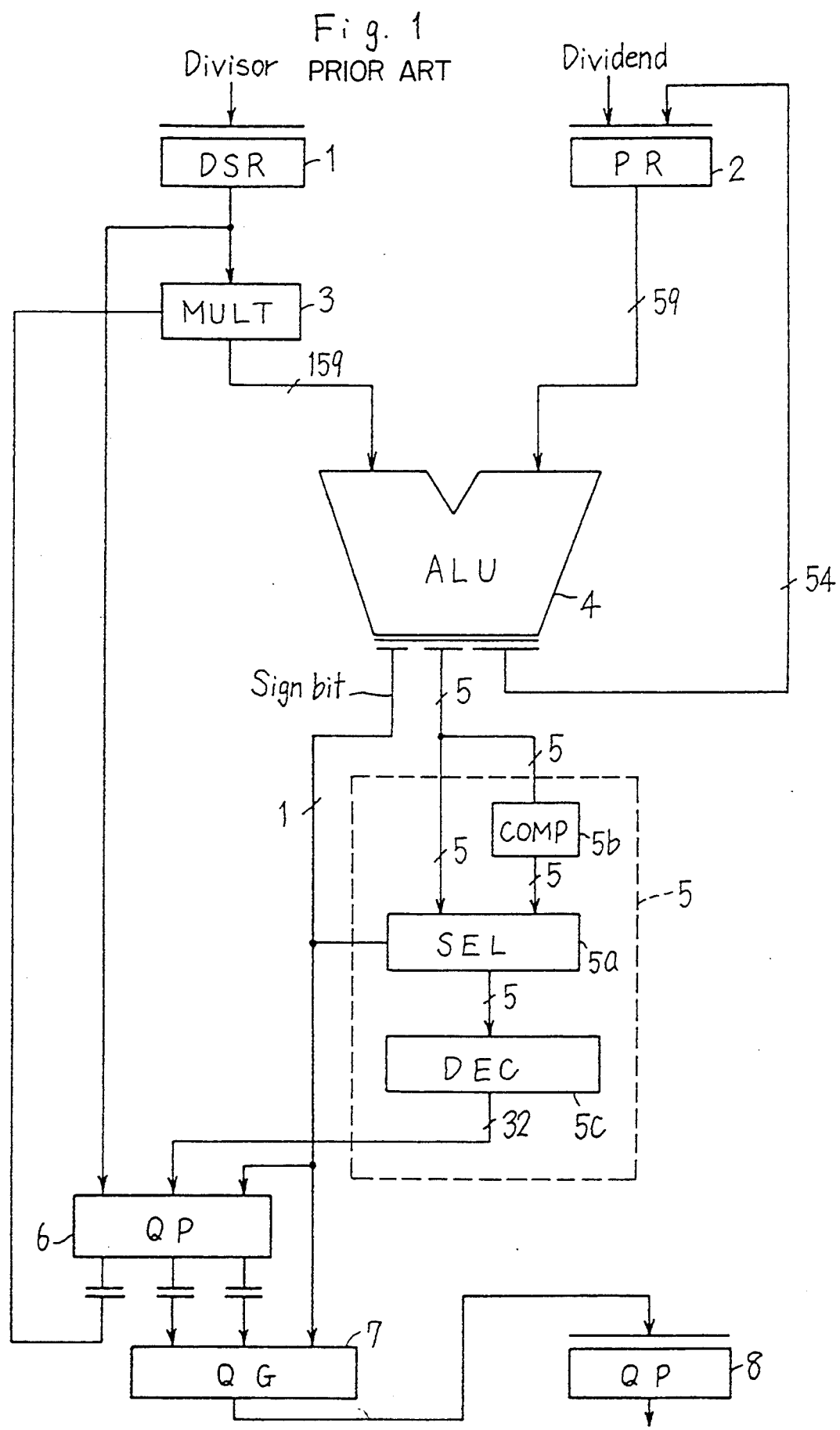
FIG. 1 is a block diagram of a prior art.
Figure 2:
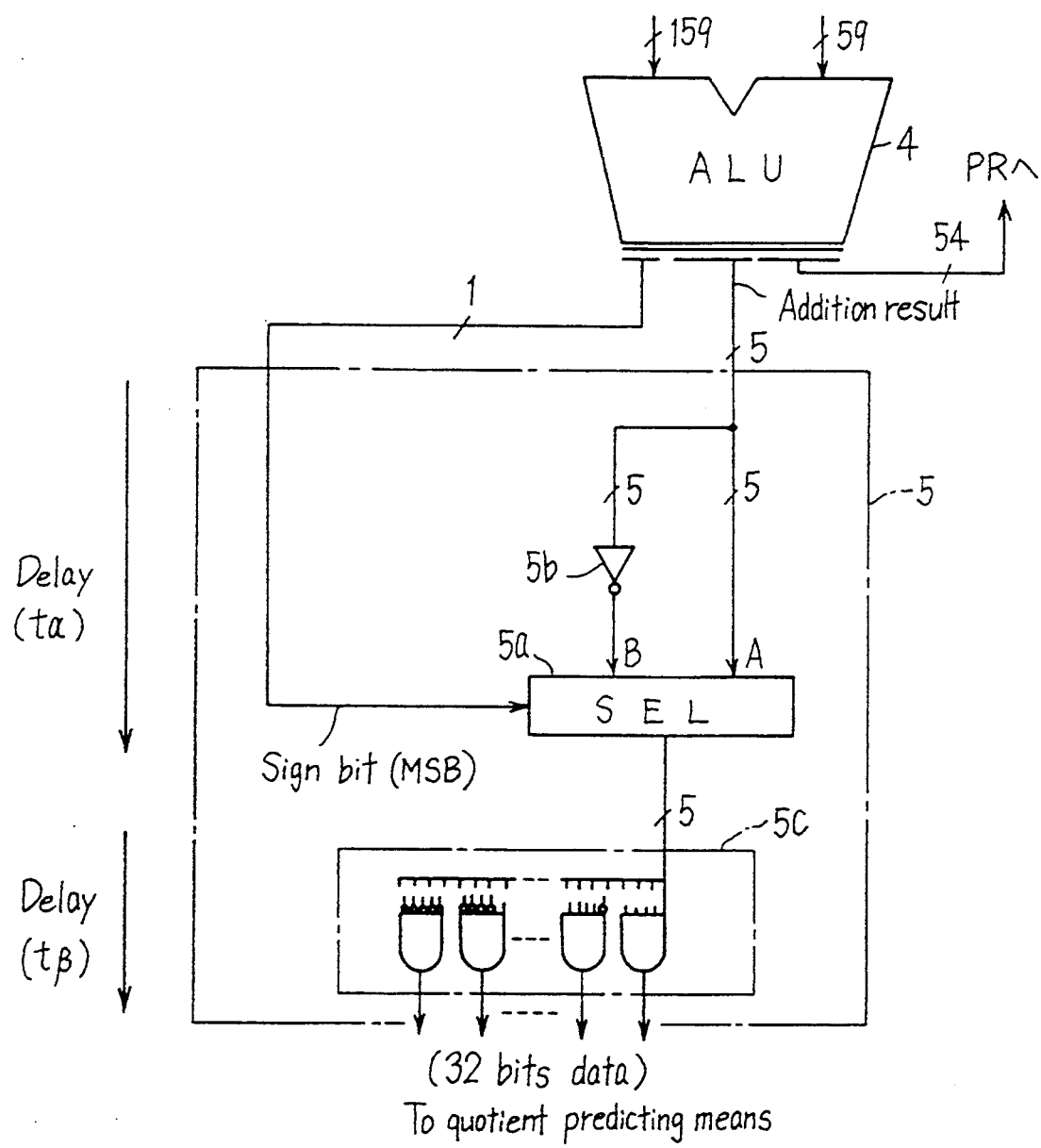
FIG. 2 is a structural diagram of the essential portion of a prior art.
Figure 3:
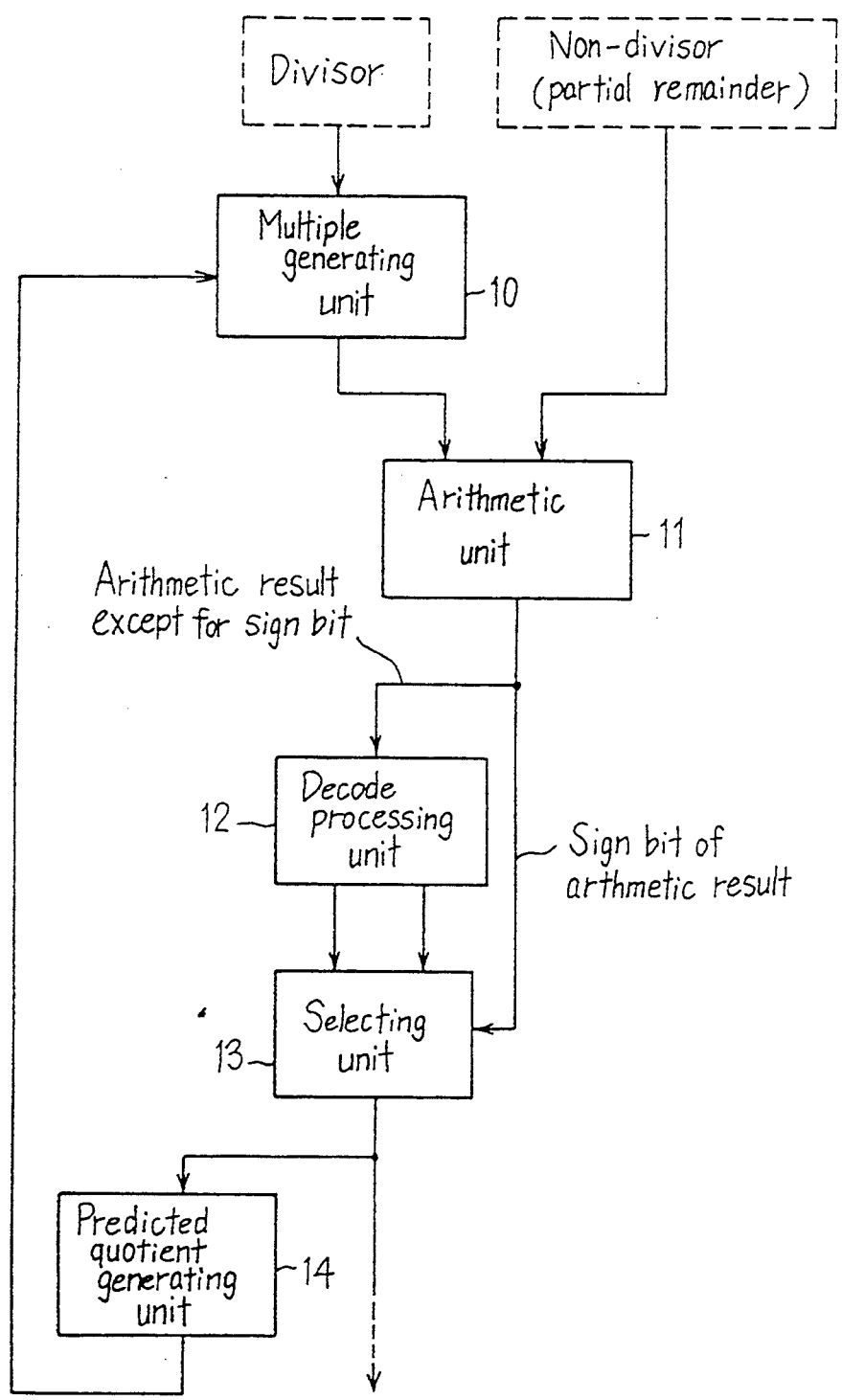
FIG. 3 is a principle diagram of the essential portion of a prior art.

A divider of the present invention may be used, for example, in a vector processor of which a total structural diagram is shown in FIG. 2. In the vector processor, division is repeated many times at a high speed based on one command. Therefore, the present invention can provide a very distinctive effect by curtailing one division cycle.

Figure 4:
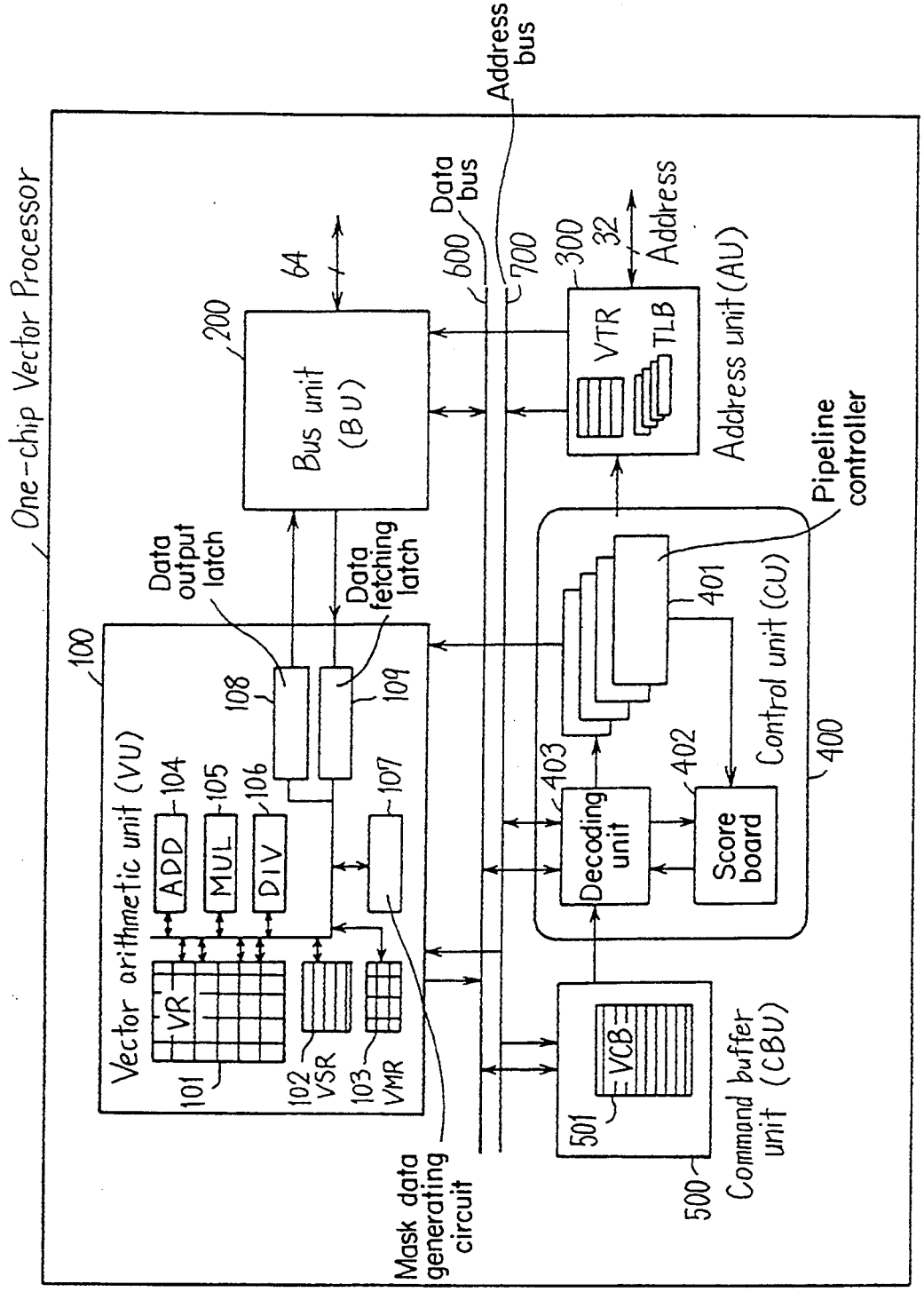
FIG. 4 is a total structural diagram of a vector processor to which the present invention is applied.

In FIG. 4, the vector processor is composed of a vector arithmetic unit (VU) 100, a bus unit (BU) 200, an address unit(AU) 300, a control unit (400) and a command buffer unit (CBU) 500. These units are mutually connected with a data bus 600 and a address bus 700.

The vector arithmetic unit 100 comprises a vector register (VR) 101 for storing vector data, a scalar register (VSR) 102 for storing scalar data, a vector mask register (VMR) 103 for storing mask data, an addition circuit (ADD) 102, a multiplication circuit (MUL) 105, a division circuit (DIV) 106, a mask data generating circuit 107, a data output latch 108 and a data fetching latch 109. The division circuit 106 corresponds to a divider of the present invention.

The bus unit 200 is provided for mediating input and output of data having a 64-bit width. The address unit 300 is for mediating the input and output of an address having a 32-bit width. The control unit 400 comprises a pipeline controller 401, a score board 402 and a decoding unit 403 for realizing control of vector processor operations. The command buffer unit 500 is provided for storing the commands required for arithmetic, within a vector command buffer (VCB) 501 having the capacity of about 1 k-byte. A vector translation register (VTR) within the address unit 300 and a conversion index buffer (TLB) are used during the conversion from the virtual address to the real address.

In a vector processor having the structure explained above, arithmetic data is read from an external memory based on the address generated in AU 300, depending on the load instruction, and is then stored in VR 101 through the data output latch 108 of VU 101.

When an instruction is stored in VCB 501, "1" is written in the start bit of the command start register (not illustrated) within CU 400 and CU 400 sends the instruction of VCB 501 to the decoding unit 403. The decoding unit 403 decodes the instruction to detect to which pipeline of VU 100 it belongs and then sends the result to VU 100. This decoding is carried out for each cycle and the arithmetic operation is also started for each cycle. In this case, different arithmetic units may have the same vector register 101 in common. But, vector register 101 is checked by the pipeline controller 401 and score board 402 in CU 400 to avoid common use. The started arithmetic unit (ADD 104, MULT 105, DIV 106 or mask data generating circuit 107) executes the specified arithmetic processing and the result of the arithmetic operation is written in an external memory, depending on the store instruction.

Here, the arithmetic processing of VU 100 is classified into load/store pipeline processing, mask pipeline processing, graphic pipeline processing, addition/subtraction pipeline processing, multiplication pipeline or division pipeline processing.

Mask pipeline processing is executed by a mask data generating circuit 107 for exchanging with the vector register 103 the data for which arithmetic operation is desired. Moreover, graphic pipeline processing is pipeline processing of graphic data and is selectively executed by the addition circuit 104, in combination with addition/subtraction pipeline processing. In addition, multiplication pipeline processing is executed by multiplication circuit 105 and the division pipeline processing is executed by the division circuit 106. Therefore, division pipeline processing can be executed, for example, in parallel with the addition/subtraction pipeline processing and multiplication pipeline processing.

Figure 5:
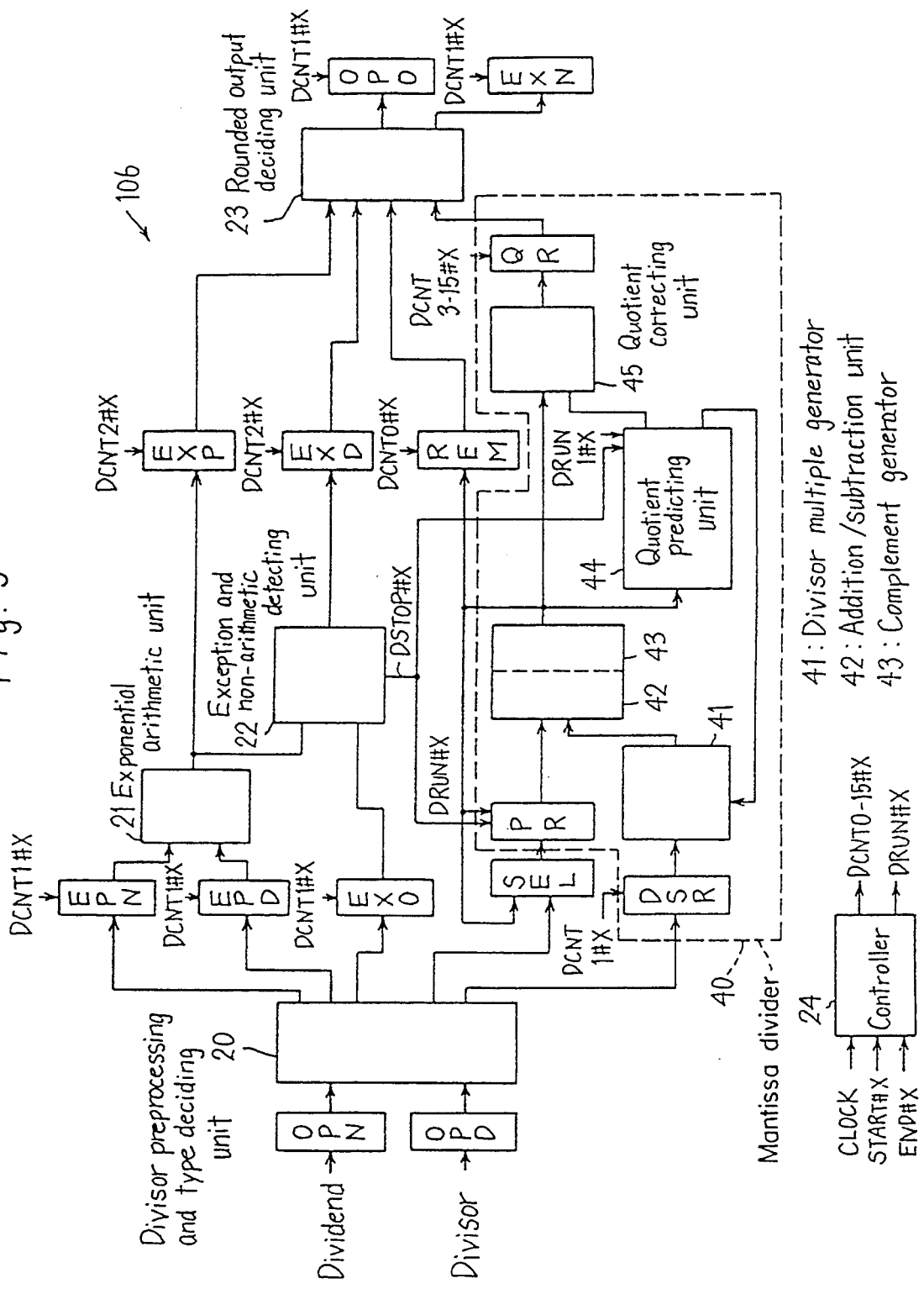
FIG. 5 is a block diagram of a dividing circuit (DIV) shown in FIG. 4.

Next, the structure and operation of the division circuit (DIV) 106 to which the divider of the present invention is applied will be explained with reference to FIG. 5.

The division circuit 106 executes floating point division based on IEEE standards. The division circuit 106 and comprises a division preprocessing and type deciding unit 20, an exponential arithmetic unit 21, an exception and non-arithmetic detector 22, a rounded output deciding means 23, a controller 22 and a mantissa divider 40. Each circuit will be explained in detail, with an example of the floating point double accuracy arithmetic processing based on IEEE standards.

bias value specified by IEEE standards are added and a result is stored in the register EXP.

Moreover, in the exception and non-arithmetic detector 22, the decisions of exception and non-arithmetic processing are detected. The decision of exception includes exception of zero division and exception of invalid operation, etc. and these exceptions are decided from the data of divisor D and dividend N. As non-arithmetic processing patterns, the following combinations are considered on the basis of IEEE standards. The patterns are decided from the data of divisor D and dividend N. Controls are carried out to output the stop signal DSTOP#X and to generate the specified patterns through the OR processing of following combinations:

| | | | | |
|---|---|---|---|---|
| SNaN ÷ SNaN | QNaN ÷ SNaN | INF ÷ SNaN | NORM ÷ SNaN | ZERO ÷ SNaN |
| SNaN ÷ QNaN | QNaN ÷ QNaN | INF ÷ QNaN | NORM ÷ QNaN | ZERO ÷ QNaN |
| SNaN ÷ INF | QNaN ÷ INF | INF ÷ INF | NORM ÷ INF | ZERO ÷ INF |
| SNaN ÷ ZERO | QNaN ÷ ZERO | INF ÷ ZERO | NORM ÷ ZERO | ZERO ÷ ZERO |
| SNaN ÷ NORM | QNaN ÷ NORM | INF ÷ NORM | NORM ÷ NORM | ZERO ÷ NORM |

Here,
SNaN: Signaling NOT Number
QNaN: Quiet NOT Number
INF: Infinity
ZERO: Zero
NORM: Number of normalized values
(From IEEE standard 754-1985)

The type deciding unit of the division preprocessing and type deciding unit 20 decides a type of divisor D and dividend N, being set respectively to the input registers OPD and OPN. That is, the type deciding unit recognizes when either the divisor D or the dividend N is not a numerical character, is zero, is infinity or is abnormal, etc. and sets the result of decision to a type deciding flag register EXC.

Moreover, the preprocessing unit respectively extracts the sign S (1 bit), exponential part EXP (11 bits) and mantissa part M (52 bits) concerning the floating point data of divisor D and dividend N, recovers hidden bits of mantissa part M (the IEEE standards normalize that the mantissa part M has a hidden bit as the higher one bit of the most significant bits) and also sets the absolute value of the mantissa part of a dividend N.

The processing of such preprocessing unit can be realized, for example, by extracting the mantissa parts of divisor D and dividend N being set to OPD and OPN respectively, to recover the hidden bit, thereafter comparing these two pieces of data to (1) execute nothing when the absolute value of the mantissa part of the dividend N is smaller than the absolute value of the mantissa part of the divisor D; or (2) shift the mantissa part of the dividend N one bit to the right (one bit is reduced) and to increment the exponential part EXP of the dividend N by one (+1) when the absolute value of mantissa part of the dividend N is larger than the absolute value of the mantissa part of the divisor D. After this preprocessing, the exponential part of the dividend N is set to the register EPN, while the mantissa part of the dividend N is stored in the partial remainder register PR, the exponential part of the divisor D is stored in the register EPD, and the mantissa part of the divisor D is stored in the divisor D register DSR, respectively.

Next, in the exponential arithmetic unit 21, subtraction of an exponential value and addition of a bias value are executed. That is, the three values of a complementary value of the exponential part of the divisor D, a value of the exponential part of the dividend N and a The stop signal DBTOP#X is active until negated at the end of the one arithmetic operation after it is asserted with the decision of data of the divisor D and dividend N. The signals other than DSTOP#X have the following significance.

START#X: This signal instructs the start of operations of the division circuit 106 as a whole and is generated by the control unit (CU) 400 shown in FIG. 4.

END#X: This signal instructs the stop of operations of the division circuit 106 as a whole and is generated by the control unit (CU) 400 shown in FIG. 2.

DRUN#X: This signal instructs the start and stop of repetitive dividing processings which are conducted by the partial remainder register PR, addition/subtraction unit 42, complement generator 43, quotient predicting unit 44 and divisor/multiple generator 41. The start of an operation is instructed synchronously with the next clock after generation of the signal START#X and stop of an operation is instructed synchronously with the stop of the clock signal responsive to the signal END#X.

DCNT0#X~DCNT15#X: These signals are generated synchronously with the next clock after the generation of the signal START#X to control the operation timing of each register of the division circuit 106 (EPN, EPD, EXO, DSR, EXP, EXD, REM, QR, OPO and EXN). These signal are structured by 16 kinds of clock signals in total from the signal DCNT0#X generated first to the signal DCNT15#X generated last finally.

Figure 6:
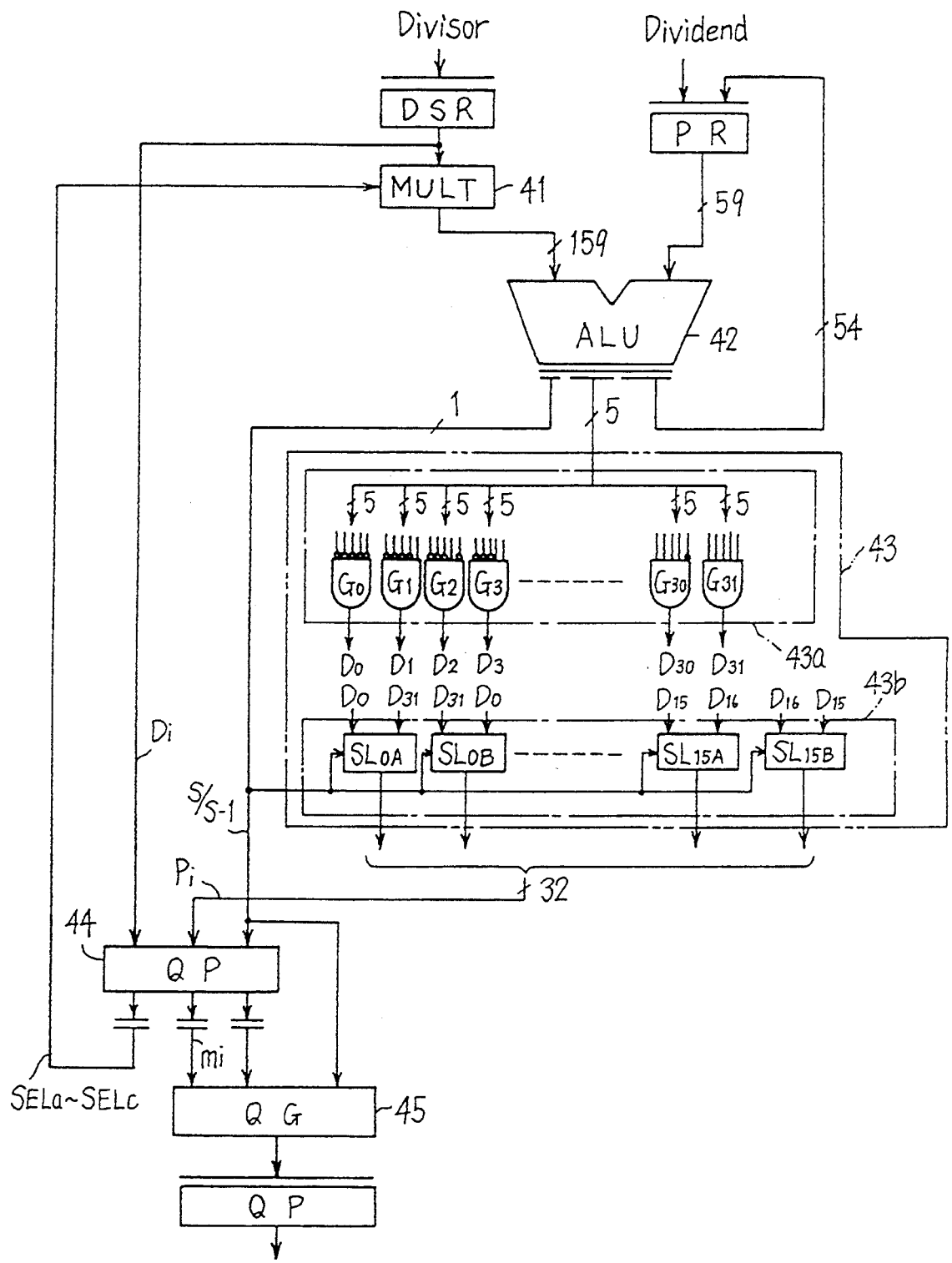
FIG. 6 is a block diagram of a mantissa divider of FIG. 5.

Next, the mantissa divider 40 executes division based on the non-restoring division method using a cardinal number 16. This mantissa divider 40 comprises a divisor/multiple generator (hereinafter referred to as multiple generator) 41, an addition/subtraction unit 42, a complement generator 43, a quotient predicting unit 44 and a quotient correcting unit 45 and also includes a divisor register DSR, a dividend register PR and a quotient register QR. The detailed structure of this mantissa divider 40 is shown in FIG. 6. In FIG. 6, the multiple generator 41 is indicated by a code name abbreviated as MULTI, the addition/subtraction unit 42 as ALU, the quotient predicting unit 44 as QP and the quotient correcting unit 45 as QG.

Figure 7:
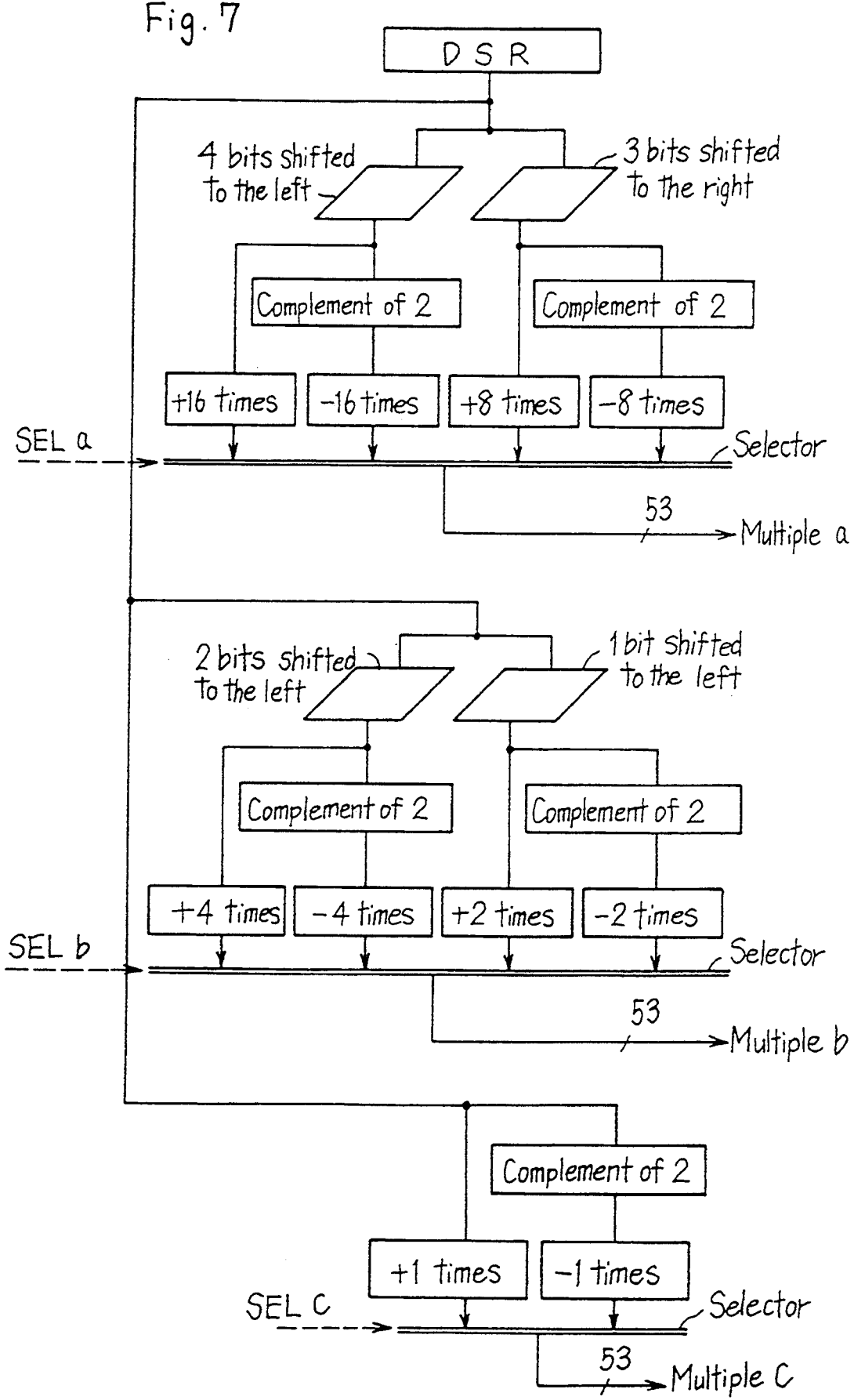
FIG. 7 is a concept structural diagram of a multiple generator of FIG. 6.

In this embodiment, since the cardinal number is 16, 30 kinds of divisor and multiple data of $-15 \times$ divisor, $-14 \times$ divisor, ..., $-1 \times$ divisor, $+1 \times$ divisor, ..., $+14 \times$ divisor, $+15 \times$ divisor are required. The multiple generator 41 is provided to generate such divisor/multiple data. As the conceptional diagram thereof is shown in FIG. 7, this multiple generator 41 is composed of a first block 41a for generating any one multiple (hereinafter called a multiple a) among $+16$ times, $-16$ times, $+8$ times or $-8$ times depending on the predetermined multiple selection signal SELa (generated by the quotient predicting unit 44), a second block 41b for generating any one multiple (hereinafter called a multiple b) among $+4$ times, $-4$ times, $+2$ times or $-2$ times depending on the predetermined multiple selection signal SELb and a third block 41c for generating any one multiple (hereinafter called a multiple c) among $+1$ times or $-1$ times depending on the predetermined multiple selection signal SELc.

The multiple generating operation of the first block 41a will be explained as the typical example. First, the $+16$ times data obtained by shifting the data in the divisor register DSR to the left by four bits (four digits are carried up), $-16$ times data obtained by taking a complement of data shifted to the left by four bits, $+8$ times data obtained by shifting the data in the divisor register DSR to the left by three bits (three bits are carried up) and $-8$ times data obtained by taking a complement of the data shifted to the left by three bits are generated and any one of these data is selected by the selector operating depending on the content of SELa.

Figure 8:
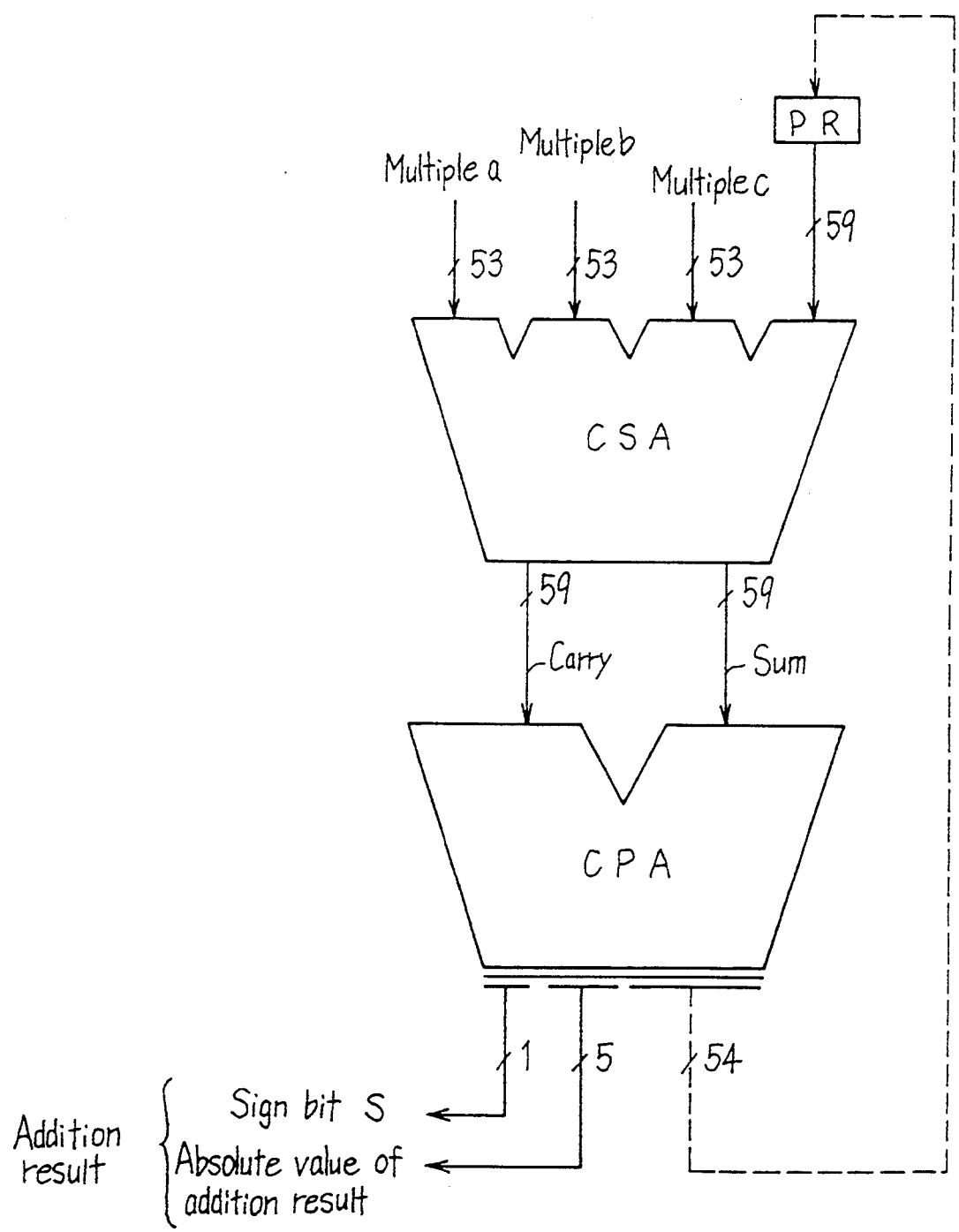
FIG. 8 is a block diagram of an adder/subtractor of FIG. 6.

The addition/subtraction unit 42 comprises, as shown in FIG. 8, a 4-input carry save adder CSA and a carry propagation adder CPA, for adding carry and sum outputted from the CSA, and outputs a result of the addition consisting of the sign bit S of MSB (most significant bit) and the significant five bits, excluding the sign bit, by subtracting a sum of the multiples a, b and c from the content of the partial divisor register PR. The significant five bits, excluding the sign bit S, are called hereinafter an "absolute value of addition result".

Figure 9:
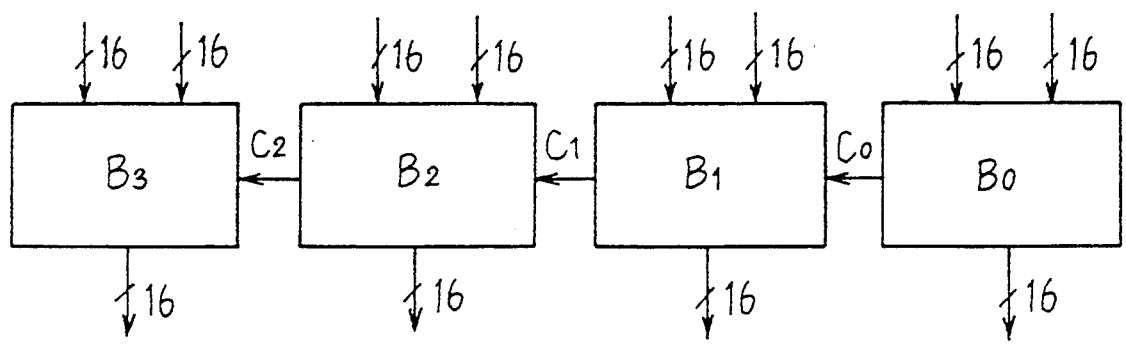
FIG. 9 is a block diagram of CPA of FIG. 8l.
Figure 10:
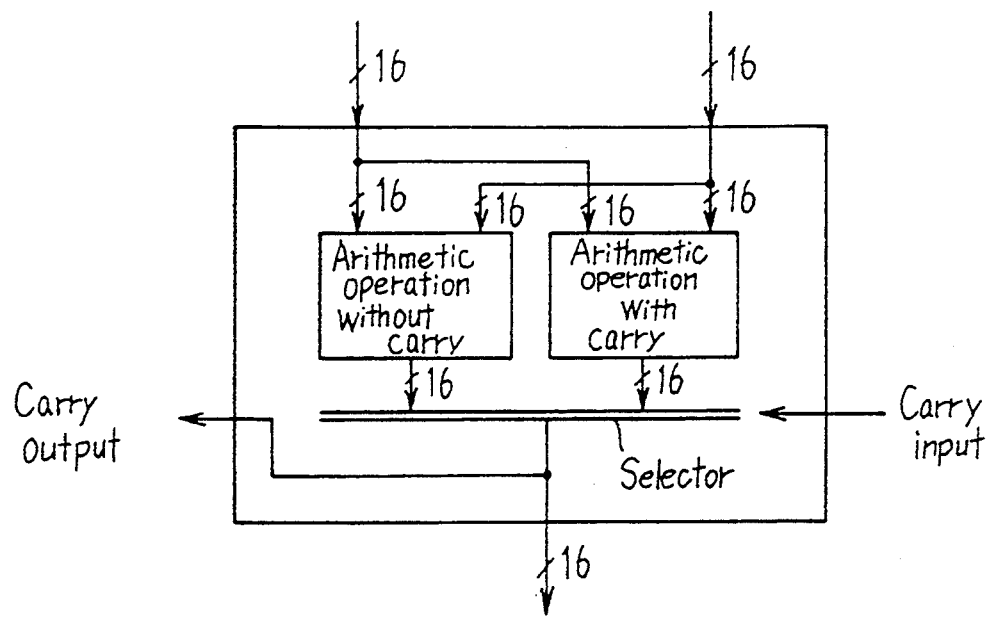
FIG. 10 is a structural diagram of a block of FIG. 9.

Here, CPA is composed of four blocks $B_0 \sim B_3$ as shown in FIG. 9. Each block comprises, as the structure thereof is shown in FIG. 10, a part for previously executing arithmetic processings based on the supposition that the carry will be conducted, and a part for previously executing arithmetic processings based on the supposition that the carry will not be conducted. Outputs of these arithmetic parts are selected depending on the carry input from the less significant side. According to this process, the carry propagation delay of the other blocks $B_1 \sim B_3$ except for the least block $B_0$ can be minimized and the arithmetic time of the CPA can be set corresponding to the carry propagation delay of the least block $B_0$. However, naturally the selector delay of each block and wiring delay, etc. are added to such a carry propagation delay.

An addition result outputted from the addition/subtractor 42 is the significant six bits among 16 bits of the most significant block $B_3$. The most significant bit is the sign bit S, and the remaining five bits become an absolute value of the addition result. Therefore, during the period from the decision of the absolute value of the addition result and the decision of the sign bit S, a delay time (corresponding to $t\alpha$), adding the select delay of each block and wiring delay to the carry propagation delay of the least significant block $B_0$, is generated.

The complement generator 43 is composed, as the structure thereof is shown in FIG. 6, of a 5-input AND gate group 43a for decoding the absolute value of the addition result and a selector group 43b consisting of 32 2-input selectors $SL_{04}$, $SL_{0B} \sim SL_{15A}$, $SL_{15B}$ for selecting the result of decoding depending on the sign bit S. The AND gate group 43a is composed of 32 5-input AND gates $G_0 \sim G_{31}$ having the same inputs as the number of bits of the addition result and each input of the AND gate is given the five bits data (addition result) having the bit weights of $[2^4, 2^3, 2^2, 2^1, 2^0]$. To the five inputs of each AND gate, the $2^4$ bits, $2^3$ bits, $2^2$ bits, $2^1$ bits and $2^0$ bit are sequentially inputted from the left end to the right end. In this embodiment, only one decoder is used, but it outputs a result of the decoding of the addition result and a result of decoding of the complement of the addition result by changing the correspondence between the decode signals $D_0 \sim D_{31}$ and the output end of the complement generator 43 with the selector group 43b depending on the sign bit. For example, since the complement of the absolute value "$00000_{(10)}=0_{(10)}$" of addition result is "$11111_{(2)}=31_{(10)}$", when the addition result is "$00000_{(2)}$", it is enough that any one of the decode signal $D_0$ of the AND gate $G_0$ and the decode signal $D_{31}$ of the AND gate $G_{31}$ is selected by the selector $SL_{04}$ depending on the sign bit. In the same manner, it is enough when the absolute value is "$00001_{(2)}=1_{(10)}$" that any one of the decode signal $D_1$ and decode signal $D_{30}$ is selected depending on the sign bit. The 5-input AND gate $G_1$ outputs the decode signal $D_2$ when the input is "$00010_{(2)}=2_{(10)}$". That is, the decode signals $D_3 \sim D_{31}$ are respectively outputted by the AND gate $G_3$ when the input is "$00011_{(2)}=3_{(10)}$", by $G_4$ when "$00100_{(2)}=4_{(10)}$", by $G_5$ when "$00101_{(2)}=5_{(10)}$", by $G_6$ when "$00110_{(2)}=6_{(10)}$", by $G_7$ when "$00111_{(2)}=7_{(10)}$", by $G_8$ when "$01000_{(2)}=8_{(10)}$", by $G_9$ when "$01001_{(2)}=9_{(10)}$", by $G_{10}$ when "$01010_{(2)}=10_{(10)}$", by $G_{11}$ when "$01011_{(2)}=11_{(10)}$", by $G_{12}$ when "$01100_{(2)}=12_{(10)}$", by $G_{13}$ when "$01101_{(2)}=13_{(10)}$", by $G_{14}$ when "$01110_{(2)}=12_{(10)}$", by $G_{15}$ when "$01111_{(2)}=15_{(10)}$", by $G_{16}$ when "$10000_{(2)}=16_{(10)}$", by $G_{17}$ when "$10001_{(2)}=17_{(10)}$", by $G_{18}$ when "$10010_{(2)}=18_{(10)}$", by $G_{19}$ when "$10011_{(2)}=19_{(10)}$", by $G_{20}$ when "$10100_{(2)}=20_{(10)}$", by $G_{21}$ when "$10101_{(2)}=21_{(10)}$", by $G_2$ when "$10110_{(2)}=22_{(10)}$", by $G_{23}$ when "$10111_{(2)}=23_{(10)}$", by $G_{24}$ when "$11000_{(2)}=24_{(10)}$", by $G_{25}$ when "$11001_{(2)}=25_{(10)}$", by $G_{26}$ when "$11010_{(2)}=25_{(10)}$", by $G_{27}$ when "$11011_{(2)}=27_{(10)}$", by $G_{28}$ when "$11100_{(2)}=28_{(10)}$", by $G_{29}$ when "$11101_{(2)}=29_{(10)}$", by $G_{30}$ when "$11110_{(2)}=30_{(10)}$", by $G_{31}$ when "$11111_{(2)}=31_{(10)}$". The selector group 43b comprises 32 selectors $SL_{04} \sim SL_{15A}$, $SL_{0B} \sim SL_{15B}$ and the decode signal pairs are inputted thereto so as to obtain the results equivalent to the decode result of the absolute value of the addition result and the decode result of complement of the addition result. Namely, a pair of decode signals, $D_0$ and $D_{31}$, are inputted to the selector $SL_{04}$. In the same manner, the following pairs of decode signals are inputted to the corresponding selectors.

$D_1$ and $D_{30}$, $D_2$ and $D_{29}$, $D_3$ and $D_{28}$, $D_4$ and $D_{27}$, $D_5$ and $D_{26}$, $D_6$ and $D_{25}$, $D_7$ and $D_{24}$, $D_8$ and $D_{23}$, $D_9$ and $D_{22}$, $D_{10}$ and $D_{21}$,
$D_{11}$ and $D_{20}$, $D_{12}$ and $D_{19}$, $D_{13}$ and $D_{18}$, $D_{14}$ and $D_{17}$,
$D_{15}$ and $D_{16}$, $D_{16}$ and $D_{15}$, $D_{17}$ and $D_{14}$, $D_{18}$ and $D_{13}$,
$D_{19}$ and $D_{12}$, $D_{20}$ and $D_{11}$, $D_{21}$ and $D_{10}$, $D_{22}$ and $D_9$,
$D_{23}$ and $D_8$, $D_{24}$ and $D_7$, $D_{25}$ and $D_6$, $D_{26}$ and $D_5$, $D_{27}$ and $D_4$,
$D_{28}$ and $D_3$, $D_{29}$ and $D_2$, $D_{30}$ and $D_1$, $D_{31}$ and $D_0$.

Figure 11:
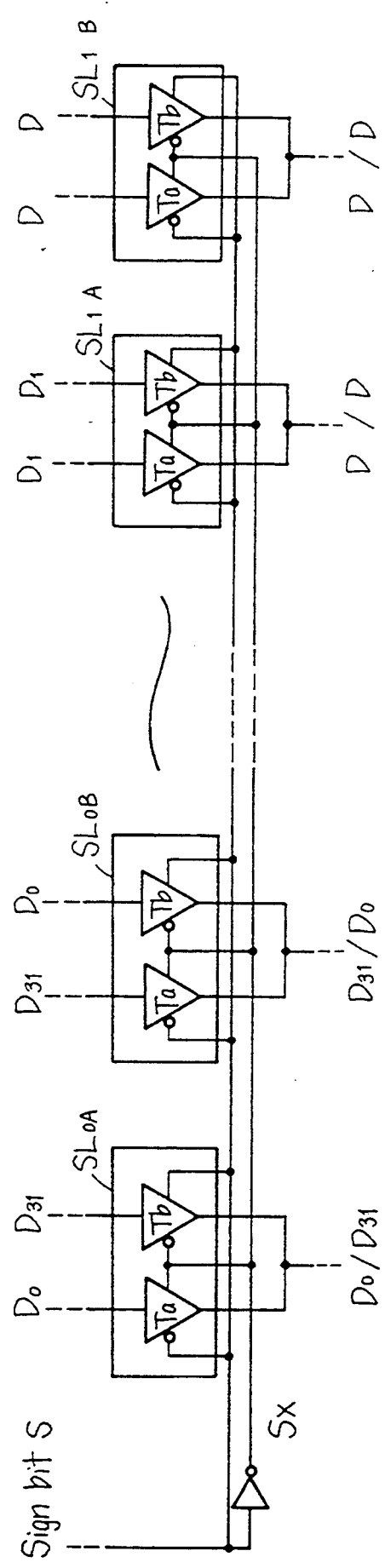
FIG. 11 is a structural diagram of a selector of the selector group of FIG. 6.

Thereby, even when only one decoder is used, the result of decoding of the input data and the result of decoding of the complements of the input data can be obtained. It is possible to provide two kinds of decoders and select outputs of these decoders depending on the sign bit. FIG. 11 is a desirable example of structure of the selectors (for example, $SL_{0A}$, $SL_{0B}$~$SL_{15A}$, $SL_{15B}$). Any one of the $D_0$ and $D_{31}$ ($D_{15}$ and $D_{16}$ in $SL_{15}$) can be selected by inputting the decode signals $D_0$ and $D_{31}$ ($D_{15}$ and $D_{16}$ in $SL_{15}$) to two pairs of transfer gates Ta, Tb and selecting only one condition of the on/off operations with the sign bit S and inverted signal Sx thereof.

Here, the complement generator 43 of this embodiment is characterized, first, by that when the absolute value of addition result is determined, the decode processing of such absolute value and the decode processing of the complement of the same absolute value are immediately executed and thereafter two decoded results are selected when the sign bit S is determined. Delay time in the arithmetic operation ($t\alpha$) corresponding to difference between the time when the absolute value of addition result is determined and the time when the sign bit S is determined can be absorbed by the decode processing time ($t\beta$) and particularly such a distinctive effect as remarkably curtailing the processing time of the non-restoring dividing operation which is repeated many times can be ensured. Moreover, it is also characterized, second, by a pair of the decoding result of the absolute value of the addition result and the decoding result of the complement of the same absolute value can be selected. The scale of the circuit of the decoding unit can be suppressed like the prior art. It is also possible to provide a divider which is just suitable for use in the one-chip vector processor in couple with the first characteristic.

Next, the quotient predicting unit 44 is provided with a first function to forecast a partial quotient of each digit based on the 9 significant bits (hereinafter, indicated by $D_1$) of the divisor D and the significant 5 bits (hereinafter, indicated by $P_1$) of the partial remainder from the complement generator 43. In this first function, for example, a predicting table as shown in FIG. 12 is used. The predicting table may also be developed in the form of a table map on a memory such as a ROM or may be formed with hard logic. In this case, the latter is desirable from the point of view of the processing rate. In FIG. 12, the reference values $P_i'$ from "$00_{(16)}$" to "$1F_{(16)}$" corresponding to the significant five bits ($P_i$) of the partial remainder are given on the vertical axis, while the predicted values of partial quotient (hereinafter, referred to as predicting quotient $m_i$) from "$F_{(16)}$" to "$0_{(16)}$" are given on the horizontal axis. In addition, the reference values $D_i'$ corresponding to combination of $P_i$ and $m_i$ are stored at the intersecting points of the line orthogonally crossing the vertical axis and the line orthogonally crossing the horizontal axis. These reference values $D_i'$ are obtained by extracting several values which may be expressed by significant 9 bits ($D_i$) of the divisor D and then arranging these values in the predetermined order. For example, if $P_i$="$0F_{(16)}$" and $D_i$="$100_{(16)}$", $m_i$="$F_{(16)}$" may be predicted as indicated by a broken line in the figure. Moreover, if $D_i$ is "$101_{(16)}$", the minimum value in the range of $D_1'$ ("$100_{(16)}$"$\longleftrightarrow$"$112_{(16)}$") including "$101_{(16)}$", namely "$100_{(16)}$" is designated and $m_i$="$F_{(16)}$" is predicted.

Furthermore, the quotient predicting unit 44 is also provided with a second function for generating the multiple selection signals SELa~SELc based on the predicted quotient ($m_1$) predicted by the first function, the preceding sign bit $S_{-1}$ and the sign bit S of this time. In this second function for example, a signal generating table as shown in FIG. 13 is used. In FIG. 13, the reference values $m_i'$ from "$0_{(10)}$" to "$15_{(10)}$" corresponding to the predicted quotient $m_i$ are given on the vertical axis and the multiple selection signals SELa, SELb, SELc of the cases when $S_{-1}$="0", that is the preceding partial remainder has a positive value and when S="1", that is, the partial remainder of this time has a negative value are respectively stored for each value of the vertical axis. However, the stored values respectively unit the magnifying powers. For example, 0 means 0 times, $-1$ means $-1$ times, . . . , $+16$ means $+16$ times.

Figure 14:
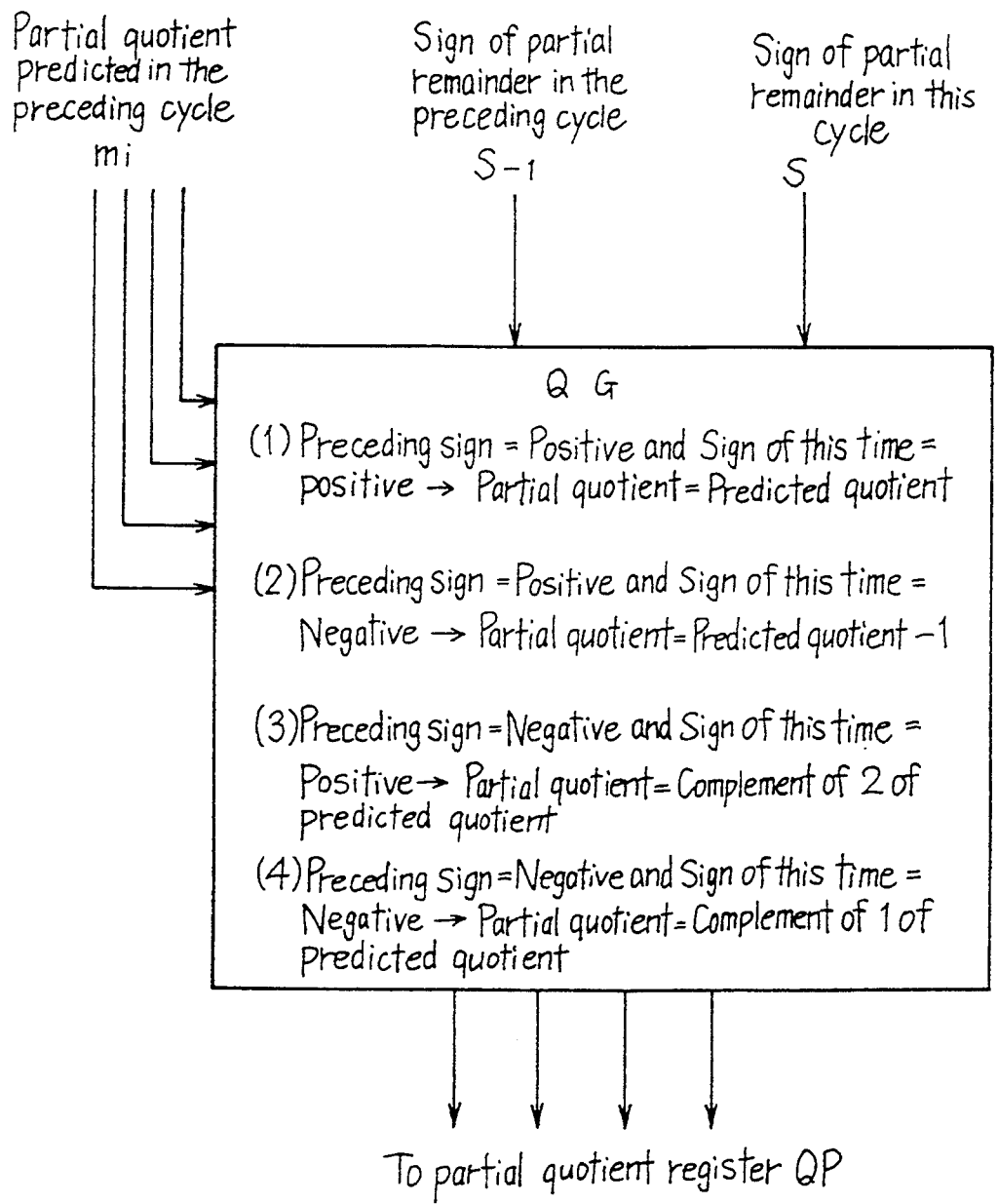
FIG. 14 is a correcting condition table diagram of a quotient correcting means (QP) of FIG. 6.

Finally, the quotient correcting unit 45 corrects the predicted quotient $m_i$ generated in the quotient predicting unit 44 depending on the sign bit (S) of the partial remainder in the repetition of this time and the sign bit ($S_{-1}$) in the preceding repetition and then sets such predicted quotient $m_i$ to the partial quotient register QP. The actual correction is executed, as its conceptional diagram is shown in FIG. 14, as follow: (1) when $S_{-1}$="0" (positive sign) and S="0" (positive sign), the predicted quotient is set to OP in direct; (2) when $S_{-1}$="0" (positive sign) and S="1" (negative sign), a value obtained by subtracting 1 from the predicted quotient is set to QP; (3) when $S_{-1}$="1" (negative sign) and S="0" (positive sign), a complement of 2 of the predicted quotient is set to QP; (4) when $S_{-1}$="1" (negative sign) and S="1" (negative sign), a complement of 1 of the predicted quotient is set to QP.

As explained above, in this embodiment, since an absolute value of the addition result generated in the addition/subtraction unit 42 and the complement of such absolute value are decoded by a 5-input AND gate group 43a before the sign bit (S) of the addition result is decided and thereafter the one of two decoding results is selected by the selector group 43b when the sign bit (S) is decided, time difference ($t\alpha$) between the absolute value of addition result and sign bit generated by carry propagation delay in the addition/subtraction means 42 can be absorbed by the decoding time ($t\beta$). That is, as shown in the timing chart of FIG. 15, the sign bit of the addition result is decided at the timing $t_1$ after the time corresponding to $t\alpha$ from the timing $t_0$ when the absolute value of the addition result is decided. However, the prior art has a disadvantage that since the selecting operation of selector 5a starts from the timing $t_1$ and moreover operation of the decoder 5b starts from the timing $t_3$ when the selecting operation is completed, such a longer time as adding the delay time of sign bit ($t\alpha$)+selecting operation time ($t_{SEL}$)+decoding operation time ($t\beta$) has been consumed until the timing $t_5$ when the decoding result is outputted.

In this embodiment, on the other hand, since the decoding operation by the 5-input inverter group 43a is started without waiting for a decision based on the sign bit, such delay time of sign bit $t\alpha$ can be absorbed during the period from the decoding operation starting time (almost matching to the time $t_0$ when the absolute value of the addition result is decided) to the decoding operation ending time $t_2$ and the total operation delay time can be reduced to such a time as adding the operation delay time ($t\beta$) of the 5-input AND gate group 43a and the operation delay time ($t_{SEL}$) of the selector group 43b. Since the selector group 43b starts the operation at the time $t_1$ when the sign bit is decided, that is, the decoding operation and preparatory operation of the selector progress simultaneously, a part or almost all operation delay ($t_{SEL}$) of the selector group 43b can be absorbed by the operation delay time ($t\beta$) of the 5-input AND gate group 43a.

A divider of the present invention can improve the processing rate on the occasion of generating a partial remainder from the addition result and therefore it is just suitable for use as a divider, for example, of the floating point coprocessor and vector processor which repeats the cyclic procedures like a non-restoring division type divider.

We claim:

1. A divider receiving as inputs a divisor and a dividend and comprising:
    multiple generating means, receiving said divisor, for generating multiples of the divisor based on a predicted quotient value;
    arithmetic processing means, coupled to said multiple generating means and receiving said multiples, for outputting an arithmetic result, of said multiples of said divisor and said dividend, and a sign bit expressing a polarity of said arithmetic result;
    decode processing means, coupled to said arithmetic processing means, for decoding of the arithmetic result, said decode processing means starting to decode the arithmetic result during generation of said sign bit, and outputting a decoding signal of said arithmetic result and a decoding signal of a complement of said arithmetic result;
    selecting means, coupled to said decode processing means and to said arithmetic processing means, for selecting, responsive to said sign bit, one of the decoding signal of said arithmetic result and the decoding signal of said complement of said arithmetic result, and for outputting a selection output; and
    predicted quotient generating means for generating the predicted quotient value, responsive to the selection output of said decode processing means.

2. A divider according to claim 1, wherein said decode processing means comprises:
    a plurality of output terminals;
    a decoder generating a plurality of outputs by decoding said arithmetic result; and
    said selecting means switches connections between a plurality of outputs of said decoder and said output terminals so that any one of the decoding signal of said arithmetic result and the decoding signal of the complement of said arithmetic result is outputted depending on said sign bit.

3. A divider according to claim 2, wherein
    said arithmetic processing means outputs the arithmetic result as a plurality of bits,
    said decode processing means comprises a plurality of logic gate circuits receiving the arithmetic result and outputting different values of decoding logic as outputs, and
    said selecting means comprises a plurality of selectors receiving corresponding two outputs among the outputs of said plurality of logic gates as inputs and selecting one of the inputs depending on said sign bit.

4. A divider according to claim 2, wherein
    said decode processing means outputs a first output and a second output complementary to the first output, and
    said selecting means receives the first output and the second output and selects one of the first output if said sign bit is positive and the second output if said sign bit is negative.

5. A divider according to claim 1, further comprising quotient correcting means for correcting said predicted quotient value based on the sign bit of the arithmetic result and the sign bit of the preceding arithmetic result.

6. A vector processor executing addition, subtraction, multiplication, and division to implement vector arithmetic operations, said vector processor comprising:
    an addition circuit executing the addition and the subtraction;
    a multiplication circuit executing the multiplication; and
    a division circuit receiving as inputs a divisor and a dividend and executing the divisions, said division circuit comprising:
        division preprocessing and type deciding means for executing preprocessing division and type deciding processing for floating point data of the divisor and the dividend,
        exponential arithmetic means for executing arithmetic processing of exponential portions in the floating point data of the divisor and dividend preprocessed by said division preprocessing and type deciding means, and
        mantissa dividing means for generating a mantissa data of a quotient by repeating procedures based on an algorithm for the mantissa part in the point data of the divisor and dividend preprocessed by said division preprocessing and type deciding means, said mantissa dividing means comprising:
            multiple generating means, receiving said divisor, for generating multiples of the divisor based on a predicted quotient value,
            arithmetic processing means, coupled to said multiple generating means and receiving said multiples, for outputting an arithmetic result, of said multiples of said divisor and said dividend, and a sign bit expressing a polarity of said arithmetic result,
            decode processing means, coupled to said arithmetic processing means, for decoding of the arithmetic result, said decode processing means starting to decode the arithmetic result during generation of said sign bit, and outputting a decoding signal of said arithmetic result and a decoding signal of a complement of said arithmetic result,
            selecting means, coupled to said decode processing means and to said arithmetic processing means, for selecting, responsive to said sign bit, one of the decoding signal of said arithmetic result and the decoding signal of said complement of said arithmetic result, and for outputting a selection output, and
            predicted quotient generating means for generating the predicted quotient value, responsive to the selection output of said decode processing means.

* * * * *

UNITED STATES PATENT AND TRADEMARK OFFICE
CERTIFICATE OF CORRECTION

PATENT NO. : 5,377,135            Page 1 of 2
DATED : December 27, 1994
INVENTOR(S) : KUROIWA It is certified that error appears in the above-indentified patent and that said Letters Patent is hereby corrected as shown below:

Column 1, line 11, change "Field of the Invention" to --BACKGROUND OF THE INVENTION--;

line 13, delete "in";

line 59, change "2" to --4--.

Column 2, line 50, change "2" to --4--.

Column 3, line 51, change "81" to --8--;

line 68, change "2" to --4--.

Column 4, line 14, change "102" to --104--.

Column 5, line 40, delete "the";

line 59, change "is set to" to --is stored in--.

Column 6, line 39, change "2" to --4--.

UNITED STATES PATENT AND TRADEMARK OFFICE
CERTIFICATE OF CORRECTION

PATENT NO. : 5,377,135
DATED : December 27, 1994
INVENTOR(S) : KUROIWA

It is certified that error appears in the above-indentified patent and that said Letters Patent is hereby corrected as shown below:

Column 8, line 39, change "$3_{10}$" to --$3_{(10)}$--.

Signed and Sealed this

Twenty-fifth Day of July, 1995

Attest:

BRUCE LEHMAN

Attesting Officer     Commissioner of Patents and Trademarks